Aug. 24, 1948. C. F. DINLEY 2,447,845
APPARATUS FOR SOLVENT EXTRACTION
Filed July 24, 1943 6 Sheets-Sheet 2
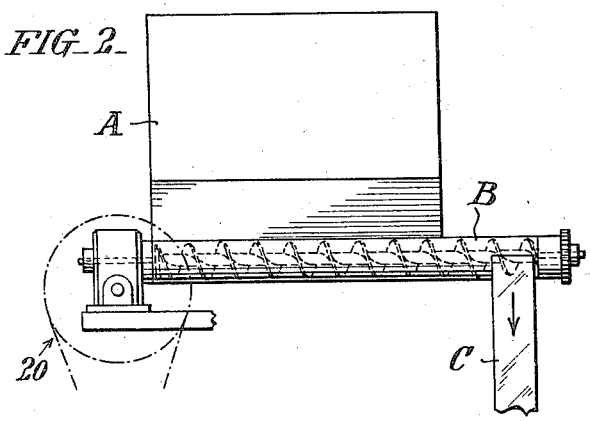
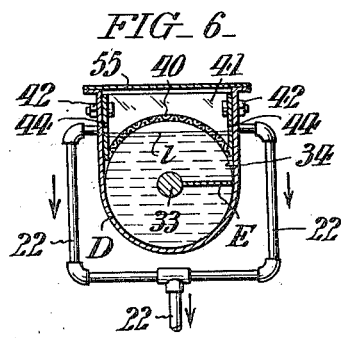
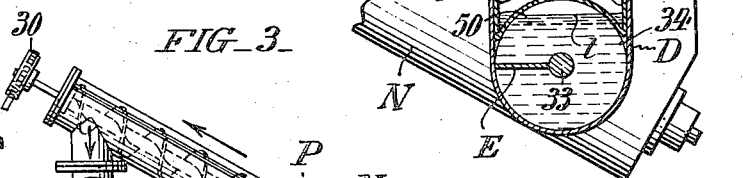
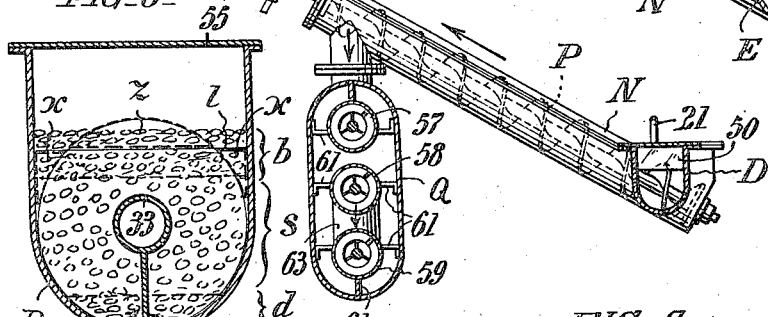
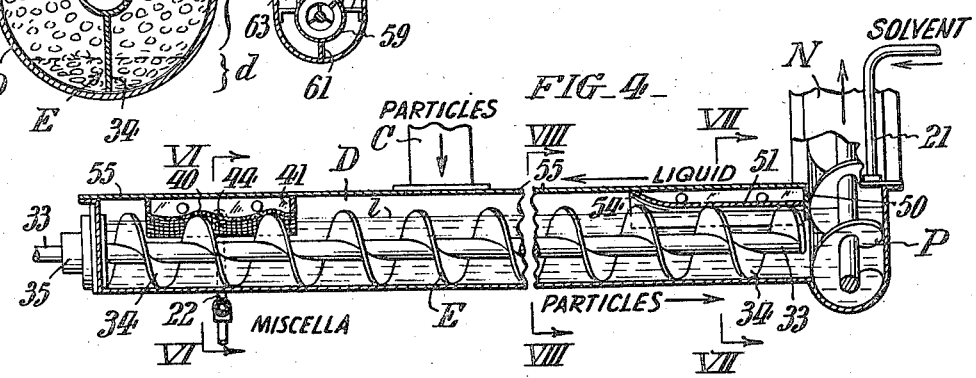
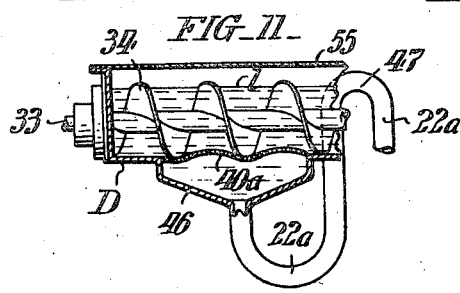
INVENTOR:
Clarence F. Dinley,
BY Paul & Paul
ATTORNEYS.

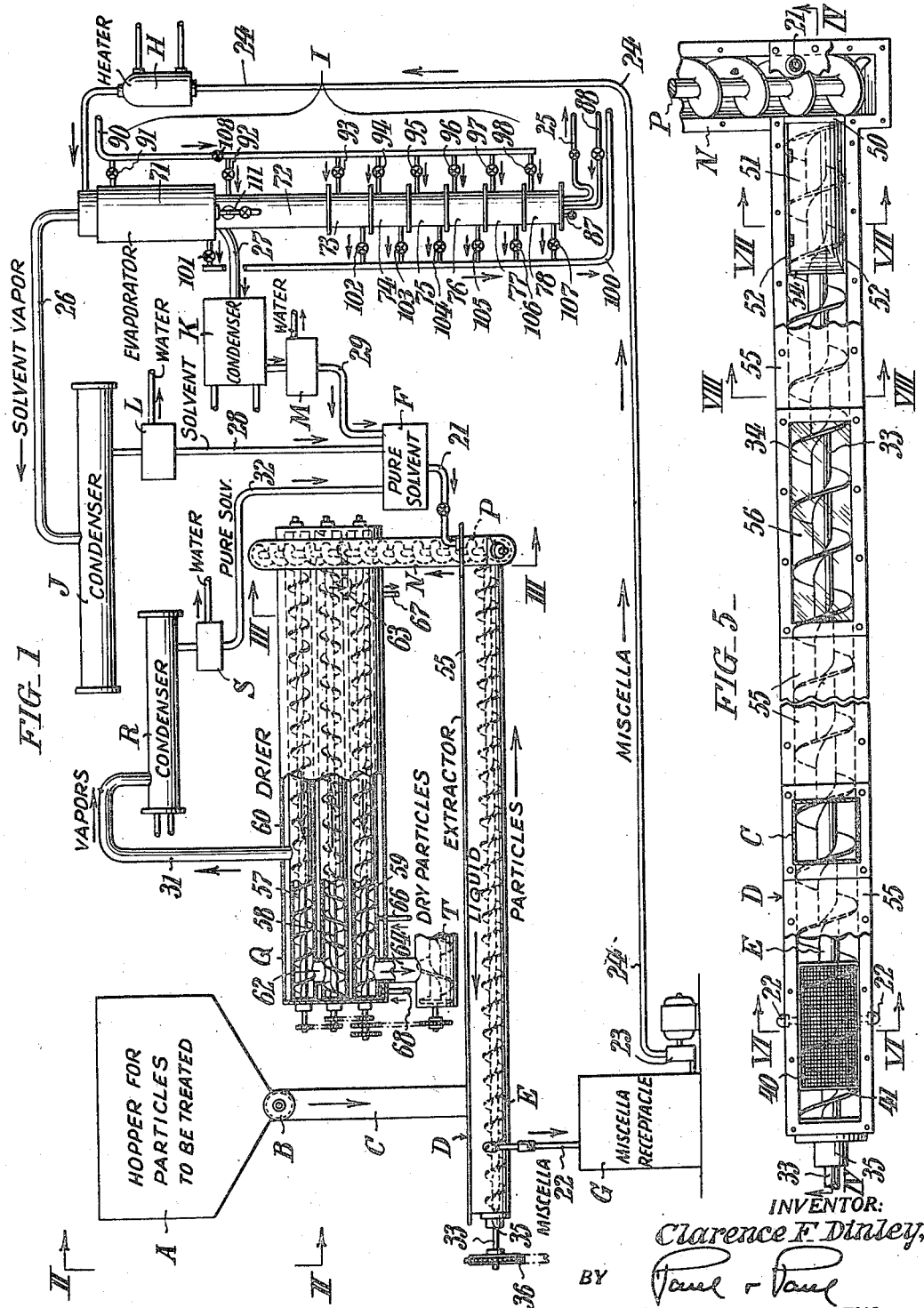

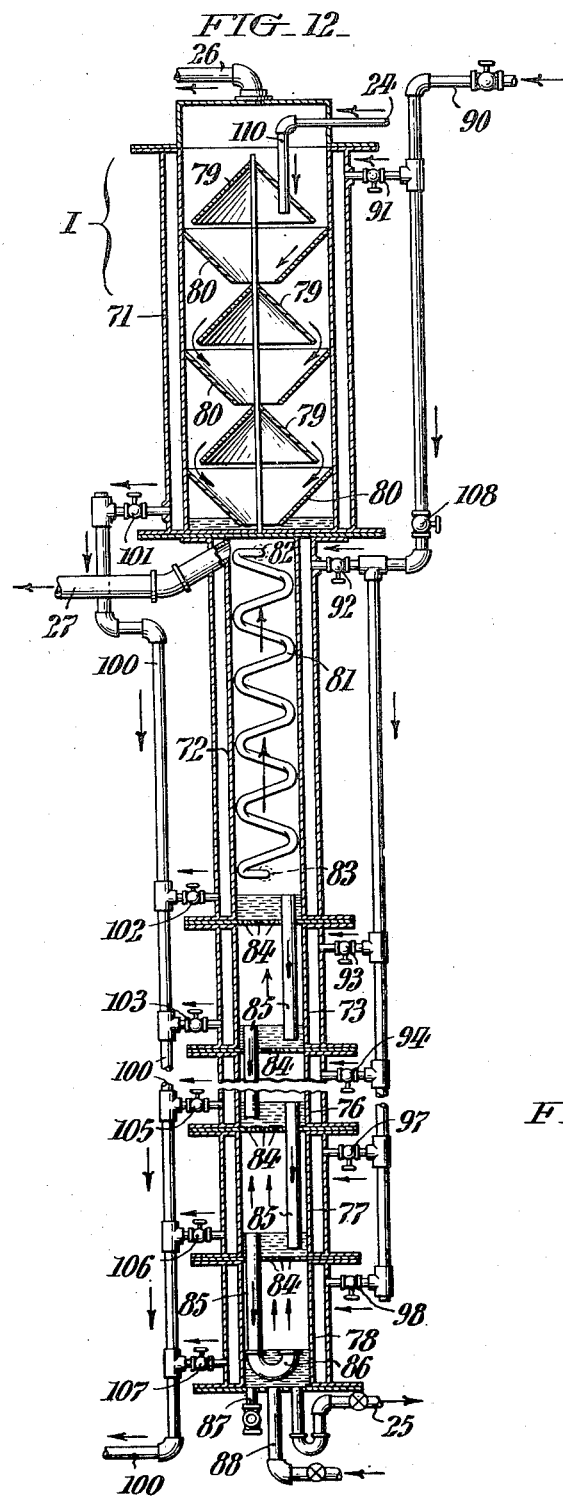
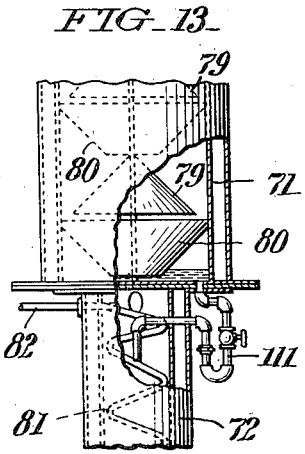
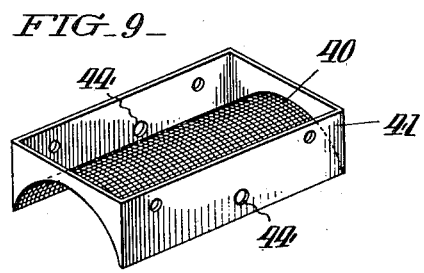
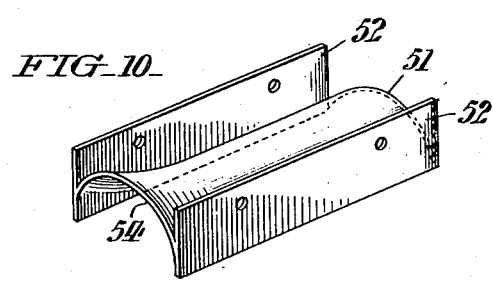

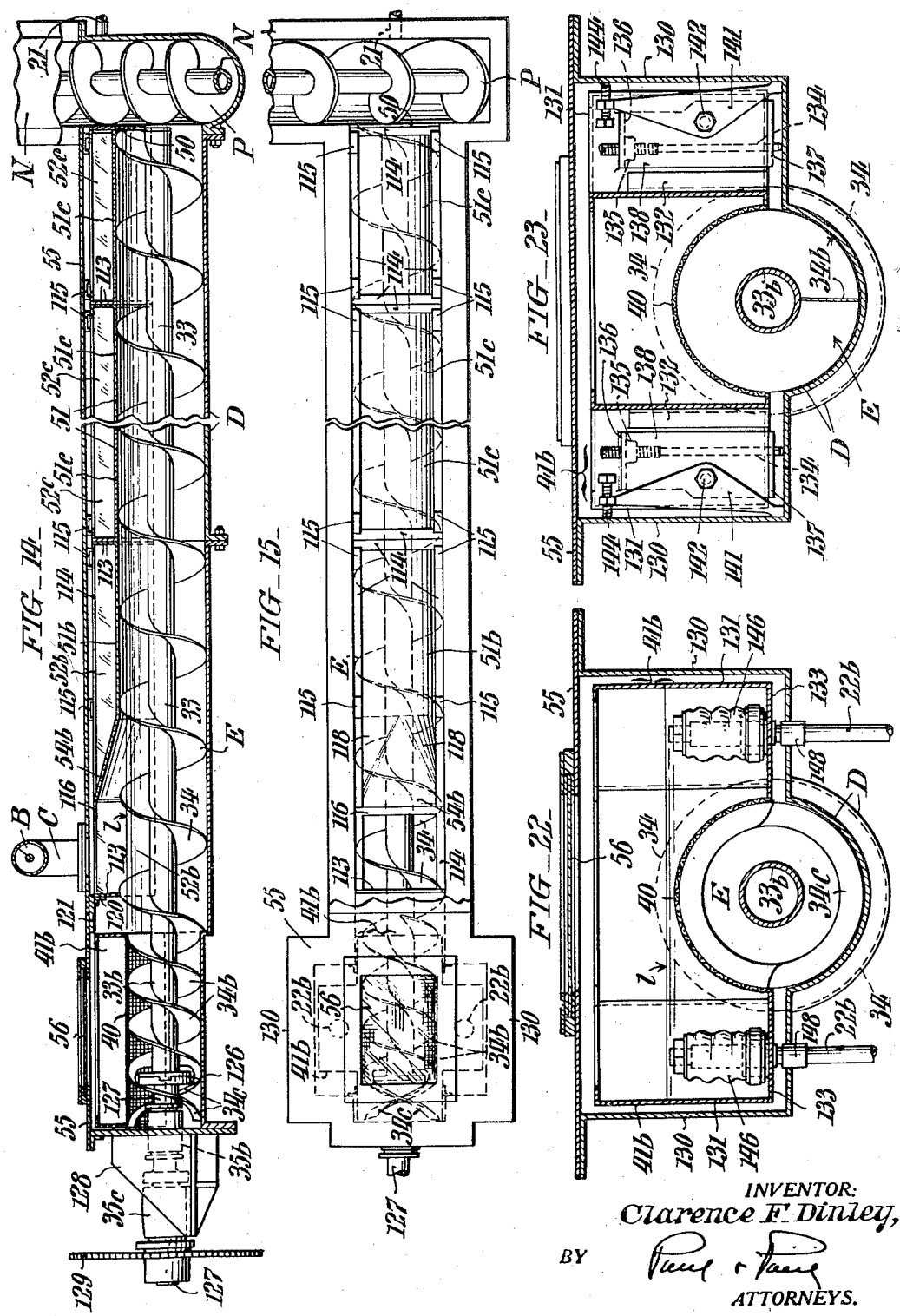

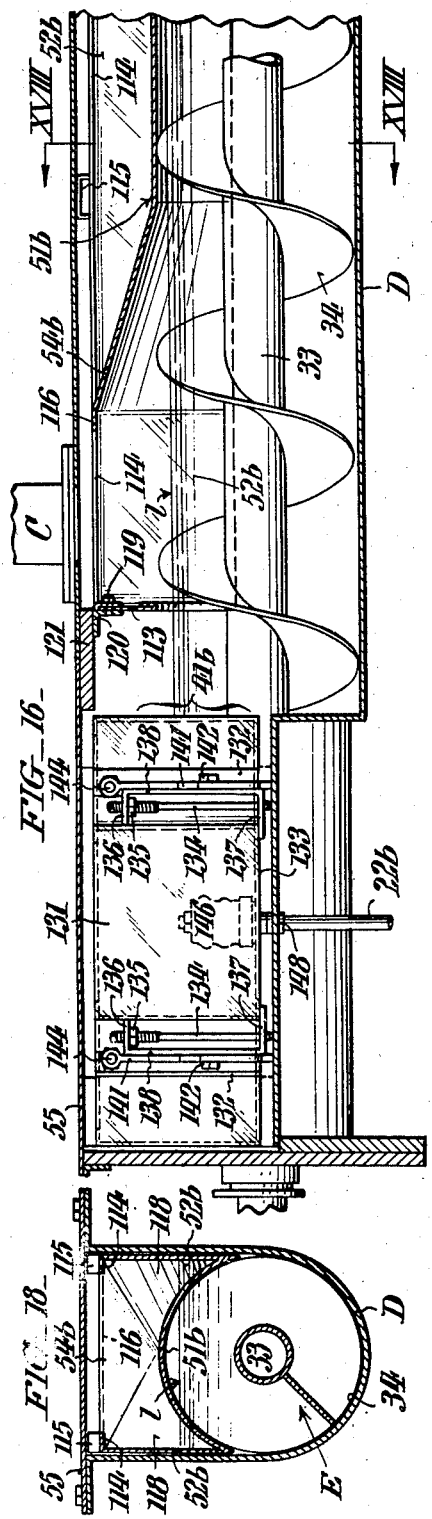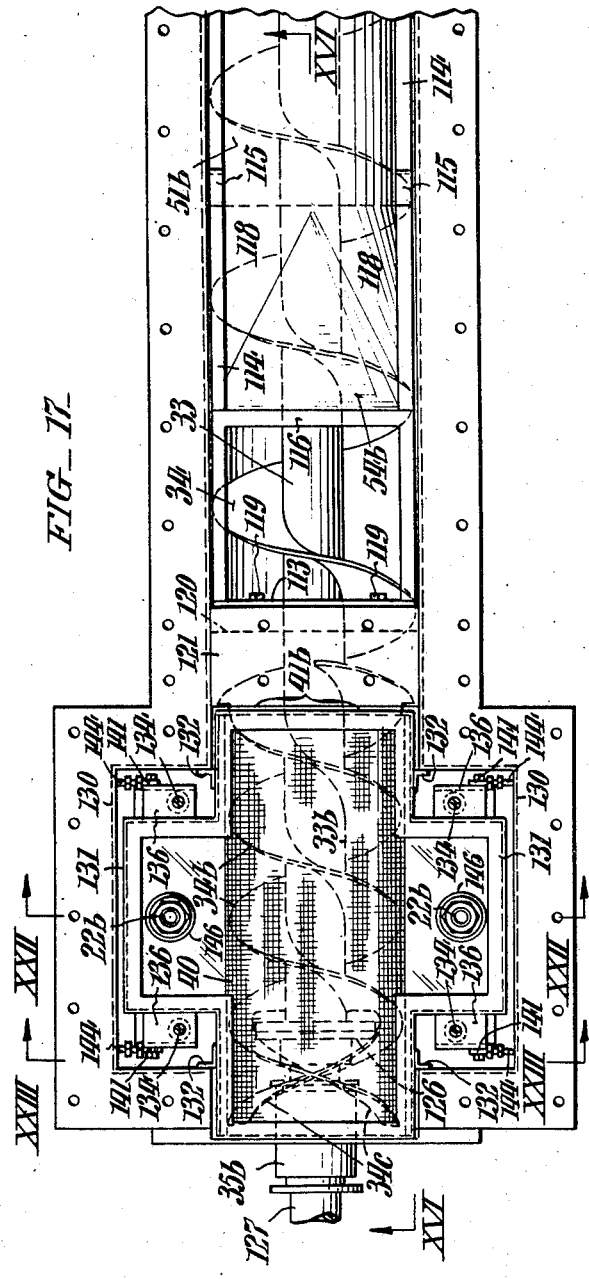

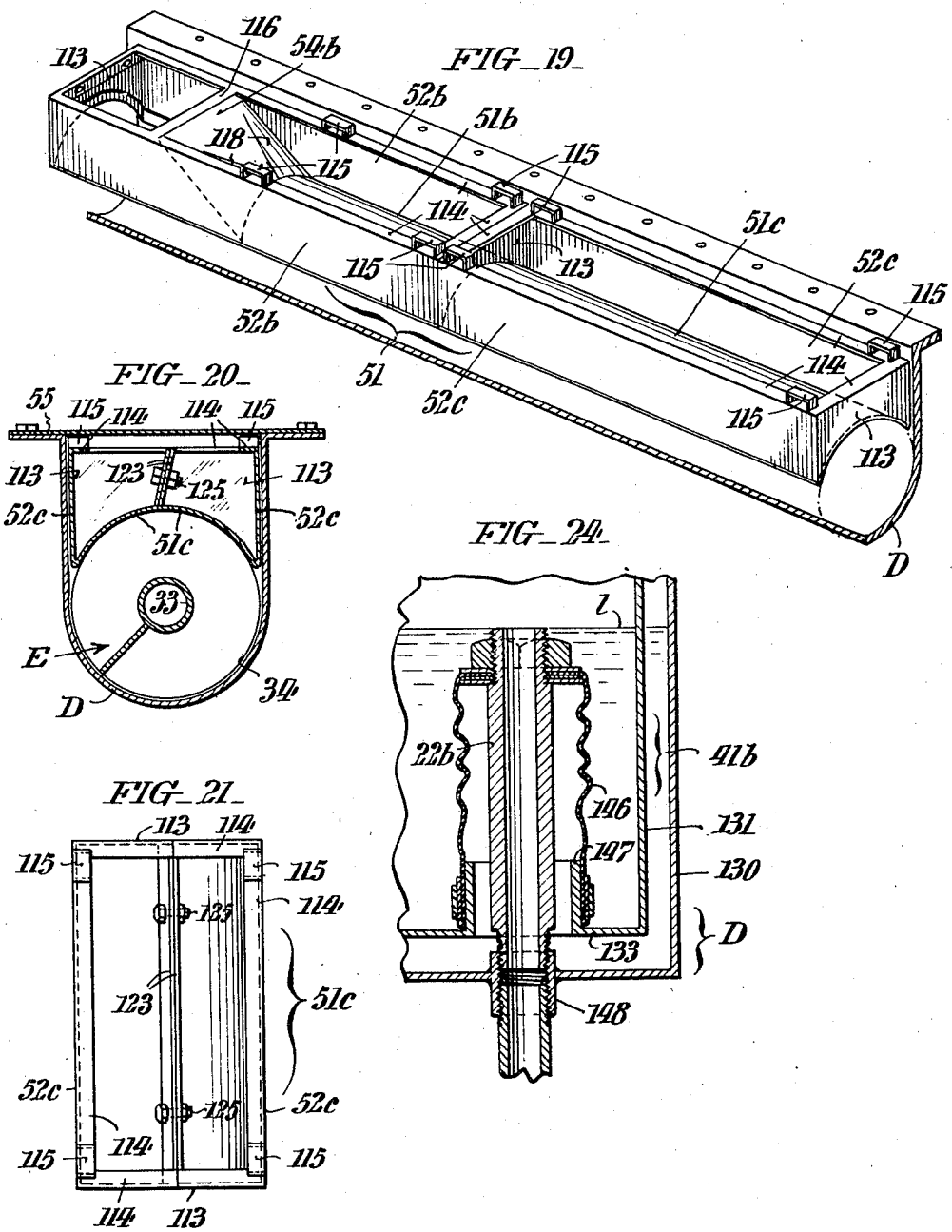

Patented Aug. 24, 1948

2,447,845

UNITED STATES PATENT OFFICE 2,447,845

APPARATUS FOR SOLVENT EXTRACTION

Clarence F. Dinley, Detroit, Mich., assignor to Detroit Rex Products Company, Detroit, Mich., a corporation of Michigan Application July 24, 1943, Serial No. 495,986

12 Claims. (Cl. 23—270)

My invention relates to the recovery of oleaginous matter or other values from suitably divided materials by means of liquid extractants, and is especially concerned with the extraction treatment of divided organic material (whether material naturally in small pieces, like seeds, or material artificially comminuted), after any necessary or desirable preparation of such material. However, the invention is also adaptable to other materials containing or bearing extractible matter. For convenience, the liquid extractants employed are hereinafter referred to throughout as "solvents", regardless of whether their action involves dissolution of extracted matter in a strict sense or not. The invention aims at a continuous treatment of material with solvent, as distinguished from a "batch" treatment, and at carrying out the treatment upon the "counterflow" principle, as it is called. The invention also involves novelty in the extraction apparatus disclosed, and especially in the provisions for filtering or straining the liquid as it is discharged from the extractor, and for preventing clogging of the strainer with fine particles of material. This feature of preventing clogging is, indeed, of broader utility than the extractor in connection with which it is here illustrated and explained.

This application is a continuation-in-part of my application Serial No. 412,547, filed September 27, 1941 forfeited December 23, 1944.

Materials which may advantageously be processed according to my invention are exemplified by oil-bearing nuts, beans, and other seeds, such for instance as soya beans, copra, flax seed, tung nuts, etc.; by avocados, olives and olive pomace; by flowers, leaves, stems, and bark such as ground alfalfa, cinchona, etc.; by various kinds of press cakes, which generally contain considerable oil left unexpelled by the pressure which they have undergone; by scraps of meat and meat fat. Amongst essential oil that may be extracted from the material containing them, I may particularly instance those of wintergreen and peppermint. Cellular materials like seeds should be crushed before treatment, thus rendering them easily penetrable by the solvent, and rupturing the oil-containing cells. Fibrous materials are fairly penetrable in their natural state, but may also be opened up by crushing. Meat scraps (with any associated fat) may be put through a hammer-mill, as it commonly done in preparing them for animal feed.

The solvent used will naturally depend on the materials treated and the substances to be dissolved out. For treating seeds and other oil or fat-containing materials, relatively non-flammable volatile chlorinated hydrocarbon solvents like dichlorinethane, dichlorethane, trichloromethane, tetrachloromethane, trichlorethane, tetrachlorethane, trichlorethylene and tetrachlorethylene amongst the chlorinated aliphatics, and amongst the chlorinated aromatics chlorobenzene and even para, meta, and ortho-dichlorbenzene—although these latter are close to the upper limits of practical volatility—are generally preferable to highly flammable volatile solvents like alcohols, benzine, gasoline, turpentine, ether, etc., etc. For extracting carotin from dried or dehydrated alfalfa, acetone is especially suitable. Chlorinated solvents may need to be stabilized against the decomposition that occurs when they are heated in contact with the air or with moisture—which is generally present in organic substances to be treated—in accordance with my Patents Nos. 2,096,735; 2,096,736; 2,096,737; 2,097,147, granted October 26, 1937. The solvent may be heated for application to the material to be treated, to increase its solvent power—though this is often unnecessary—and it is usually heated and even vaporized in separating and recovering it from the oleaginous or other values that it has dissolved, and from the spent material that has been treated with it.

In treating divided material according to my invention as hereinafter described, volatile liquid solvent, such as trichlorethylene, for example, is passed along in one direction in a treating vessel having the character of a substantially horizontal trough, while substantial particles of the material to be treated, such as crushed soya bean flakes (which are sometimes loosely referred to as "meal"), are fed along mechanically in the opposite direction in the channel. The mechanical feed means here illustrated and particularly described is in the nature of a rotary "endless" screw, resembling what is commonly called an "Archimedes screw." The rotary motion of this feed screw may be either continuous or intermittent. It is desirable that the particles treated be thin, like crushed soya bean flakes, to facilitate access of the solvent to the matter to be extracted; but I have found that they should not be fine like flour, or cornmeal, or contain an extreme proportion of such fines, because the very fine matter is difficult to feed counter to the liquod flow, and also tends to bring about clogging of the apparatus. In general, however, a substantial minor percentage of dust-like fines may be tolerated; and the material may be in particles of various sizes, or may be broken up a good deal, so long as enough of the fragments remain substantial particles rather than flour or dust. The essential point is that even when in contact in the liquid, the substantial particles (i. e., particles of substantial size, as distinguished from fines) should afford ample interstices for its passage amongst them, instead of forming a relatively impermeable mud or dough.

The general idea of extraction treatment of divided material fed by screw devices against a counter-flow of liquid extractant is not new, and has even been proposed for the treatment of soya beans with trichlorethylene. So far as I am aware, however, such schemes have hitherto failed of successful operation, because the screw and its conduit became clogged with closely packed particles, through which the liquid would not flow under a practicable degree of pressure or "head."

When a feed screw is employed to feed divided material through a conformable conduit or "barrel," several conditions are possible. If the feed screw channel fills up with the divided material, and the screw revolves very rapidly in a smooth barrel-bore, the screw virtually ceases to feed, deliver or receive the material. Under this condition, counterflow of liquid through the material jammed in the screw channel would be useless— even if it could be brought about—because of the impossibility of delivering the treated material. If the barrel is provided with longitudinal grooves or ribs to prevent rotation with the screw of the material packed in the screw channel, then packed material may feed through the screw, and may even be delivered against considerable pressure—as in the ordinary screw-feed meat grinder, for example—but, again, counterflow of liquid through the tight-packed material in the screw channel is practically out of the question.

If liquid is supplied into a rapidly revolving screw, instead of divided material, the screw will function as a pump to deliver the liquid against a certain pressure head; or if it is sought to force liquid through the revolving screw counter to its natural direction of feed, a corresponding pressure head must be employed for this purpose. In either of these cases, loose particles of divided material suspended in the liquid will not alter the picture, but will travel with the liquid in whichever direction the latter flows, unless, of course, the divided material should accumulate and pack in the screw somewhere, and plug it up. If the rate of rotation of the screw is so low as to make it of little or no effect as a pump, the divided matter can thus plug it up the more easily, unless, of course, the counterflow of liquid is so vigorous as to sweep the divided material backward before it and prevent it from entering the screw. But if the solid mattter is mechanically forced in against the liquid head, it will manifestly be bound to accumulate somewhere in the screw channel and plug it up, because material will not advance in the screw channel against the liquid flow except as it is pushed forward by more material piling up in the channel behind, until the accumulation fills the channel and plugs it. This is so even when the divided material is introduced in quantities decidedly less than the feed capacity of the screw.

This stoppage is what eventually happens in any screw in a conduit (e. g., a sloping conduit) in a portion of which there is a hydrostatic head of liquid opposing the screw feed of the divided material.

If the conduit is a level, open trough in which the liquid level is above the top of the screw, it is obvious that any buoyant material will travel with the liquid counter to the direction of screw feed; or if the liquid level is below the top of the screw, and the divided material piles up at any point above the top of the screw, then the piled material will pack and prevent the flow of liquid in any substantial quantity.

I have found, however, that a new and successful operating condition—a condition not referred to above—is possible with a feed screw in a substantially horizontal conduit or channel when the liquid level is nowhere so high, relative to the screw, that substantial or objectionable counter-feed of divided material by the liquid is possible, and the volume of the material is everywhere less than the volumetric capacity of the available space for it in the feed channel, allowing, of course, for the space occupied by the screw or mechanical feed means itself. Under these conditions, and when the rate of motion of the feed means is insufficient to make it effective as a pump to prevent counterflow of the liquid, a screw can be made effective to feed thin particles one way, while the liquid flows very gently in the opposite direction amongst them, under the head represented by a very slight difference in liquid level in the two ends of the channel.

Under the conditions here referred to, soya bean flakes introduced into the liquid in the channel tend to be slightly buoyant, so that many or most of them remain suspended in the liquid, while others float at its surface, and a mere fraction sink to the bottom, though during the period of contact with the liquid required to accomplish satisfactory extraction (e. g., some 20 minutes more or less for soya bean flakes in trichlorethylene), the flakes tend to become "water-logged" with the solvent, and so more of them may become submerged than at first. While the liquid flows gently in the screw channel counter to the direction of screw feed, the buoyant particles remain in a layer at the top of the liquid, the heavier particles sink to the bottom, and the rest engage with these top and bottom layers sufficiently to be prevented from moving with the liquid; and so they are advanced in the channel by the screw. In the case of particles which are not buoyant at all—like thin oily metal shavings or chips, for instance—gravity keeps them at the bottom of the channel, but does not pack them closely so as to prevent flow of the liquid amongst them, and they are readily advanced against the liquid flow by the screw. In the case of particles which are all buoyant, this buoyancy keeps them at the top of the channel, with similar effects. In all cases, the slowly revolving screw shifts particles around in the liquid, continually exposing new areas more freely to solvent action, and opening fresh paths of flow amongst the particles. Everywhere the particles are kept dispersed and loose in the liquid, since the slow screw motion and the gentle liquid flow nowhere exert sufficient pressure on them to pack them.

Various other features and advantages of my invention will appear from the description hereinafter of species and embodiments thereof, and from the drawings. All the methods, features, parts, and combinations here shown or described are of my invention, so far as novel.

In the drawings:

Fig. 1 is a diagrammatic or schematic elevational view of a system of apparatus for the recovery of oleaginous matter from divided material by extraction with solvent, including separation of the solvent from the extracted oil, as well as the extraction treatment of the oil-bearing material.

Fig. 2 is a side view of the supply hopper and infeed means shown in Fig. 1 from the left of that figure, taken as indicated by the line and arrows II—II;

Fig. 3 is a side view of conveyor or feed means for transferring spent material from the extractor to a drier, with the extractor and the drier in section as indicated by the line and arrows III—III in Fig. 1.

Fig. 4 shows a vertical longitudinal section through the extractor on a larger scale than Fig. 1, a portion being broken out and removed to shorten the figure;

Fig. 5 is a corresponding plan view of the extractor, with some parts partly broken away and removed;

Figs. 6, 7, and 8 show cross-sections through the extractor, taken as indicated by the lines and arrows VI—VI, VII—VII and VIII—VIII in Figs. 4 and 5;

Fig. 9 is a tilted or prespective view of a part pertaining to the extractor;

Fig. 10 is a tilted or perspective view of another part pertaining to the extractor.

Fig. 11 is a fragmentary longitudinal sectional view corresponding to the left-hand end of Fig. 4, but showing a modification;

Fig. 12 is a vertical sectional view of the still shown in Fig. 1;

Fig. 13 is a fragmentary side view, partly sectional, taken at right angles to Fig. 12.

Figs. 14 and 15 are longitudinal sectional and plan views similar to Figs. 4 and 5, illustrating a modified form of extractor;

Figs. 16 and 17 are sectional and plan views of one end of the extractor, on a larger scale than Figs. 14 and 15, Fig. 16 being taken as indicated by the line and arrows XVI—XVI in Fig. 17, and Fig. 17 being taken without the extractor cover plates shown in Fig. 15;

Fig. 18 shows a cross-section through the extractor, taken as indicated by the line and arrows XVIII-XVIII in Fig. 16;

Fig. 19 is a fragmentary tilted or perspective view of a portion of the extractor channel or trough with an associated top shroud or deflector, but omitting the feed screw;

Fig. 20 is a cross-sectional view illustrating a modified construction of the shroud or deflector;

Fig. 21 is a plan view of a length of the shroud constructed as in Fig. 20;

Figs. 22 and 23 show cross sections through the liquid discharge end of the extractor, taken as indicated by the lines and arrows XXII—XXII and XXIII—XXIII in Fig. 17;

Fig. 24 shows a similar fragmentary cross-section taken in the same position as Fig. 22, but showing in section a part there shown in elevation, and drawn on a larger scale.

I will first explain the entire extraction system that is illustrated in Fig. 1, before describing in detail the extractor which is a central feature of my present invention.

In using the system here illustrated to process crushed soya bean flakes, the flakes are accumulated in a hopper A (Figs. 1 and 2) into which they may be supplied directly from a crusher, not shown. From the bottom of the hopper A, the thin particles or flakes gravitate into a feed device B in the form of an Archimedes screw (driven from any suitable source of power at constant, regulable speed, as through a chain and sprocket and speed-reducing connection 20) by which they are metered and delivered at a definite, regulable rate through an upright chute or spout C into the extractor D, comprising a substantially horizontal channel or trough through which the particles are fed (in the direction indicated by the lower arrow) by mechanical means shown as a rotary feed screw E, while liquid solvent such as trichlorethylene is passed along in the trough in the opposite direction (as indicated by the upper arrow). As shown, the pure solvent is supplied from a storage tank F through a valved inlet pipe 21 delivering into the particle-discharge end of the trough D, or substantially so, and the oil-laden solvent or miscella is discharged through a valved outlet pipe 22 substantially at the other end of the trough D, below the top of the feed screw E. The effective level or crest of the outlet 22 controls the level of the liquid in the trough D, and preferably maintains it a little below the tops of all the feed screw convolutions. The miscella drawn off through the outlet pipe 22 runs into a receptacle or tank G, whence it is drawn by a motor-driven pump 23 and delivered through a pipe line 24 and a steam-heated "exchange" heater H into the top of a steam-heated still I which is described hereinafter, and in which the extracted oil is separated from the liquid extractant or solvent by vaporizing the latter. The oil is drawn off from the bottom of the still through a valved pipe 25, while the solvent vapors pass off through pipes 26, 27 to water-cooled condensers J, K. From these the condensate passes through water-separators L, M and pipes 28, 29 to the solvent storage tank F.

As shown in Figs. 1, 3, 4, and 5, treated or spent material is removed from the discharge end of the extractor by means in the nature of an elevating conveyor. Accordingly, the discharge end of the extractor channel D opens into one side of an elevator casing or lift tube N containing a conformative rotary elevating feed screw P which may be driven from any suitable source of power at constant regulable speed, as through a chain and sprocket connection 30. As shown in Fig. 3, the tube N and screw P are inclined at an angle of substantially 30° to the horizontal, such an angle having been found to enable the screw P to lift the wet material in a loose condition, without danger of packing in the screw. The extractor feed screw E delivers the spent particles directly into the lower end of the casing or conduit N, and the liquid in the channel D also fills the lower end of the casing N to the same level, indeed, the solvent inlet 21 is here shown (Figs. 1, 3, and 4) as opening and delivering directly through the top wall of an upward-enlarged chamber at the lower end of the tube N. The elevator screw P lifts the spent material out of the liquid and delivers it downward into the top of a steam-heated drier Q, Fig. 1, which is described hereinafter. In the drier Q, the particles are agitated and heated to vaporize off the solvent associated with them, and the solvent vapors pass off through a pipe line 31 to a water-cooled condenser R. From this the condensate passes through a water-separator S and a pipe line 32 to the solvent storage tank F. The dried particles are discharged from the bottom of the drier Q into an Archimedes screw conveyor T that delivers the spent material for disposal. As the spent particles are lifted by the elevator screw P right out of the pure solvent supplied from tank F through pipe 21, very little of their oil remains with them to be lost when they leave the drier Q.

The water removed from the condensate in the separators L, M, S includes both that which the solvent takes up from the material being treated and any atmospheric moisture that may find its way into the solvent in the extractor D, through the infeed C or otherwise, or may leak into any of the apparatus of the system. It will be observed that the casing or conduit N communicates at its upper end with a region or enclosure (i. e., the drier Q) where solvent vapors evolve from the removed particles; accordingly, provision is made to prevent escape of vapors from conduit N into extractor D and thence into the atmosphere—through infed C or otherwise—as is described hereinafter.

Recurring, now, to the extractor which is a central feature of my present invention, it is to be remarked that in the sectional views which are Figs. 4, 6, 7, and 11, the liquid is shown in it without any attempt to represent the particles being treated; whereas in Fig. 8, which is a section on a larger scale, the liquid and the particles being treated are both represented.

The extractor proper is shown in Figs. 1, 4, 5, 6, 7 and 8 as comprising a round-bottomed or U-shaped horizontal channel or trough D equipped with a rotary helical feed screw E conformable to the semi-cylindrical trough bottom, and consisting of a shaft 33 carrying a single thin, wide, continuous helical "thread" 34 of moderate pitch. As illustrated in Figs. 4 and 5, the screw shaft 33 (which may be made hollow for lightness) extends out at the left through a bearing and stuffing box 35 at the end of the trough D into which material is introduced by the infeed chute C; but in the main the feed screw E simply rests on the trough bottom, so that the edge of the thread 34 revolves in wiping contact with the trough bottom substantially throughout the length of the trough, although this is not an essential feature. The feed screw E may be driven from any suitable source of power at substantially uniform regulable speed, as through a chain and sprocket connection 36 to the left-hand end of the screw shaft 33, Fig. 2.

Provided it is low enough to avoid appreciable pumping action—that would interfere with solvent flow as desired through the channel D—the speed of rotation of the feed screw E is not very critical with respect to the proper operation of the extractor. However, the rate of rotation of the screw E should be correlated with the screw pitch and with the effective length of the channel D (from the infeed C to the removing means P at N) to give a suitable period of contact between the solvent and the flakes or particles for effecting extraction of the desired oleaginous or other values. For treating crushed soya bean flakes with trichlorethylene at ordinary room temperature such as 20° C., a contact period of the order of 20 minutes (more or less) has proved satisfactory; while for treating oily metal shavings, a contact period of the order of 2 minutes or thereabout has been found adequate. The longer time for soya flakes corresponds to the necessity for the solvent to penetrate their oil cells; whereas oily metal shavings or chips carry the oil on more exposed surfaces. As illustrative of feed screw speeds that have been used successfully in treating very different materials in the same apparatus, I may mention $\frac{1}{10}$ to 5 or 6 R. P. M. for flaked soya beans, and 10 to 20 R. P. M. for metal shavings of chips. But of course these speed ranges would vary according to the effective length of the extractor.

As shown in Figs. 1, 4, 5, the infed chute C introduces the particles or flakes into the trough D and into the feed screw E at a point some distance from the left-hand end of the extractor, while the miscella outlet 22 is situated approximately or almost at the left-hand end, a substantial interval ahead of the point of flake introduction. Thus the rightwise feeding action of the screw E tends to prevent particles from approaching the point of miscella withdrawal. To exclude particles and fines that do nevertheless approach the outlet 22 from the liquid there withdrawn, foraminous filtering or strainer means 40 is provided preferably at said outlet, herein shown as comprising a finely meshed resilient strainer fabric curved over the feed screw from side to side of the channel D and arranged to be in contact with the screw thread, said screen being lax rather than taut both lengthwise and crosswise of the channel. For the treatment of soya flakes, wire screening of 40 or 100 to 200 or 300 mesh per inch has been found suitable. As shown in Figs. 4, 5, 6 and 9, the margins of the overslung wire mesh 40 are attached to the lower edges of a rectangular sheet metal box-frame 41 that is fitted and secured (as by screw bolts 42) between the upright channel sides, the ends of this box 41 being arched to accommodate and conform to the top of the screw E. As shown in Fig. 6, the miscella outlet pipe 22 has branches connected into opposite sides of the channel E at points corresponding to the desired liquid level in the channel, directly in line with holes 44, 44 through the sides of the screen frame 41, above the screen. Thus the liquid passes upward through the screen to the openings 44, 44. Owing to the contact of the resilient screen fabric 40 with the thread of the conveyor screw, this flexible strainer is continually wiped and flexed outward (in an undulatory manner) by the "progressing" convolutions 34 of the screw E as it revolves, so that its orifices formed by the meshes are distorted to expel mealy particles or fines, allowing them to be scraped off by the edges of the screw thread convolutions 34. In other words, while the screw shaft 33 and threads 34 at the right of the strainer 40 serve as a means for feeding to the right the divided material introduced at C—as well as for preventing the feed of such material to the left by the counterflowing solvent—the screw threads 34 in contact with the strainer 40 serve mainly as a means for wiping and flexing the strainer to keep it open. Thus the screen is effectively kept clear for passage of liquid through it.

While the arrangement of the strainer 40 above the feed screw E as just described is convenient to facilitate inspection and removal for repair or special cleaning, Fig. 11 illustrates a variation in which a wire mesh strainer 40a is bent and underslung to embrace the lower portion of the screw E over a recess or sink 46 which is formed as a depression of the trough bottom, and into which the miscella outlet pipe 22a is connected. To raise the effective level of the outlet and maintain the desired liquid level in the channel D, the outlet pipe 22a may be bent into an S-trap with a crest 47 at the proper level. As in the embodiment already described, the wire screen 40a is arranged to be in contact with the screw in an undulatory manner as the convolutions of the screw wipe it. Thus the screen 40a is effectively kept clear, essentially as above described with respect to the screen 40.

As shown in Figs. 4, 5, and 7, there is at the discharge end of channel D and feed screw E a barrier wall 50 which in effect forms a downward extension of the vapor-containing or retaining wall of the conduit N (that communicates with the region in the drier Q where solvent vapors evolve from the removed particles), and dips into the liquid in the channel D and in the lower end of the conduit N, thus providing a liquid seal to prevent escape or passage of vapor through conduit N into the extractor D. In front of the barrier 50, the extractor trough D is arched over and in effect reduced to a cylindrical casing conformable all around to the feed screw E—instead of a U-shaped channel—to control or prevent any tendency of treated particles afloat on the liquid in the trough to pile up against the barrier 50. For this purpose, a semi-cylindrical sheet metal shroud, filler, or deflector 51 (Fig. 10) is mounted in this end of the channel D in a manner very similar to the mounting of the strainer 40: i. e., it has upstanding side flanges 52 fitted and secured (as by screw bolts 53) between the upright channel sides. The front end of the deflector 51 is shown as flared upward at 54 to depress approaching particles. Thus the deflector 51 coacts with the top of the feed screw E and deflects, directs, and compels the particles downward into the screw channel, and to pass under the liquid-seal barrier 50 instead of piling up in front of it.

To prevent or minimize loss of volatile solvent from the extractor, the channel-trough D is shown in Figs. 1, 4, 5 as covered over from end to end with cover plates 55, some or all of which may embody transparent window(s) 56 to permit observation of what occurs in the channel. The extractor D is vented and "breathes" through the infeed C, which opens through the cover 55 so that neither super-atmospheric nor sub-atmospheric pressure can exist in the extractor to interfere with its proper functioning.

In operation, the pure liquid solvent admitted at 21 fills the lower end of the casing N and the trough D to the substantially constant level determined by the overflow outlet 22, as indicated by the horizontal line l (Figs. 4, 6, 7, 8 and 11) approximating but below the tops of the screw thread convolutions 34, and, therefore, below the curved channel top formed by the shroud 51. Substantially unaffected by the slow rotation of the screw, the liquid flows in the screw channel and from right to left in the trough D, as indicated by the upper arrows in Figs. 1 and 4: i. e., there is a very high percentage of slip as between the liquid and the screw. The thin particles or flakes introduced through the chute C fall into the liquid between the screw convolutions 34 as these convolutions slowly "progress" from left to right under the chute C.

As rather sketchily indicated in Fig. 8, some of the particles introduced at C may be so dense as to sink at once to the bottom of the channel D and form a layer d that is held there by gravity, notwithstanding the motion of the screw convolutions 34 and the slow flow of liquid amongst these particles; other particles are buoyant and float in the liquid as a top layer b, partly protruding or even held up above the surface l, and partly weighed down and kept submerged by the topmost particles; and the rest of the particles, too light to be sinkers and too dense to be floaters, are suspended in the liquid (to whose density they at least approximate closely) as a sort of intermediate layer s imprisoned between the layers d and b. By their contact with one another and with the bottom and top layers d and b, the particles of this intermediate layer s are as it were keyed and anchored against spiral movement in the screw channel with the liquid, and thus compelled to feed along to the right with the layers d, b under the action of the screw E, as indicated by the lower arrows in Figs. 1 and 4. Of course the relative thicknesses and the separating boundaries of the several layers b, s, d as shown in Fig. 8, are arbitrary, and in any case tend to change somewhat as particles in the layers b and s become water-logged with solvent during their travel to the right and sink into the layers s and d; but qualitatively the picture presented by Fig. 8 is correct, and is maintained throughout the trough D, substantially from the particle-introducing means at C to the removing means N.

In all three layers b, s, d and throughout their travel under the impulsion of the screw E, the particles are everywhere maintained loose and unpacked, and thus freely pervious to the counterflow of the liquid amongst them. Moreover, they are gently agitated and shifted about in the liquid as a result of their frictional contact with the rotating screw E as they are fed along by it, thus exposing fresh surfaces and opening up fresh paths for the freer counterflow of the liquid. Favorable in both these respects is the fact that the particles travel substantially straight along in the trough D, while the liquid flows oppositely to the direction of their travel, so that the condition is not at all what it would be if the solvent flow were pushing, crowding, and packing the particles together directly against each of the screw convolutions 34. Of course the dash-outlined corner spaces x, x in the trough D at the top of the screw E afford some theoretical opportunity for by-passing or short-circuiting the liquid flow in the screw channel convolutions, as well as for counterfeed of particles by by-passed counterflowing liquid; but with a liquid level l slightly below the top of the screw, as here shown, these spaces are so small that such counterfeed is in a practical sense prevented.

Very important to the successful operation of the extractor as described is the quantity or volume of particles in relation to the effective or available volumetric capacity of the feed trough D to the level l of liquid in the trough, allowing, or course, for the presence and displacement of the feed screw E. It is important that the volume of particles should everywhere be substantially less than the available volumetric capacity of the trough D to this level l, so that the particles can remain loose and unpacked in the liquid, and freely pervious to its flow. Generally speaking, a quantity of soya bean flakes of the order of 50% to 70% more or less of the volumetric capacity of the screw channel itself represents good practice, i. e., a volume of flakes which if merely introduced loose into the screw trough, in the absence of any liquid and without becoming packed together at all, would occupy about one-half to three-fourths of the volume of the screw channel, excluding, of course, the dash-outlined corner spaces x, x in the trough D in Fig. 8, but including the dash-outlined segmental space at z above the level l. If the quantity of particles in one or more screw channel convolutions materially exceeds the indicated maximum, packing together of the particles so as to plug the screw is liable to occur; whereas a quantity substantially less than the indicated minimum represents inefficient use of the apparatus, though it does not prevent successful handling of the reduced quantity of particles. With respect to the danger of clogging, it is of some consequence that when wet with the solvent, soya bean flakes become somewhat pasty and sticky on their surfaces.

It will be seen, therefore, that the particle-introducing screw B, the extractor feed screw E, and the removing feed screw P should be operated or driven in such speed relations to one another that the feed capacity of the screw E substantially exceeds that of the screw B, but is substantially less than the effective capacity of the removing means P. In other words, the removing means P must assuredly remove the spent or treated particles from the discharge end of the extractor feed screw E, as they reach the same, without allowing accumulation there, which would eventually pack and plug up the apparatus. This means that it must remove these particles faster than they are fed and delivered by the extractor feed screw E. Similarly, the conveyor means in the drier Q now to be described should be operated at such speed as to be capable of carrying spent material at a faster rate than it is supplied by the removing or transfer means P.

As shown in Figs. 1 and 3, the steam-heated drier Q contains a vertical series of (three) horizontal screw conveyors 57, 58, 59 comprising cylindrical tubes which are equipped with conformative rotary feed screws and are enclosed in a sheet metal casing 60, to which they are attached by supporting spacers 61. The spent material from the extractor D is delivered by the transfer or removing means P into the right-hand end of the top conveyor 57, passes to the left-hand end thereof and falls through a connection 62 into the intermediate conveyor 58, passes to the right-hand end thereof and falls through a connection 63 into the bottom conveyor 59, passes to the left-hand end thereof and falls out of the drier Q through a connection 64 into the discharge conveyor T. The conveyors 57, 58, 59 and T may all be driven at the same speed by a chain and sprocket connection from any suitable source of power (not shown) to the shaft of one of them, and by chain and sprocket interconnections amongst their shafts. The intermediate conveyor 58 may rotate in the same direction as the conveyors 57, 59 but may be of opposite pitch. The speed of the conveyors should be such as to carry the spent material through the drier Q in a loose state faster than it is supplied thereto by the transfer means P, to insure against overfilling or clogging the drier. Saturated steam for heating the material in the conveyors 57, 58, 59 may be introduced into the drier Q through a supply pipe 66 connected to the bottom of the drier casing 60 near one end, and may be exhausted (along with any condensation) through an exhaust pipe 67 connected to the bottom of the casing 60 near its other end. Dry steam to assist in vaporizing and displacing the solvent from the spent material may be introduced into the delivery end of the lowermost conveyor 59 by means of a pipe connection 68, to flow through the conveyors counter to the movement of the spent material and be vented from the top conveyor 57 through the pipe 31 to the condenser R, along with the solvent vapors. The pipe 31 is shown connected to the top conveyor 57 at a point where the dust is still well saturated with solvent, so that any dust of fines rising from the lower conveyors 58, 59 is caught and kept from entering the condenser. Preferably the feed screws of the drier conveyors 57, 58, 59 are of an open-center type, as represented in Fig. 3, to afford more space for the circulation of steam and solvent vapor through the conveyors, rather than of the wide, solid type used in the extractor D.

As shown in Figs. 1, 12 and 13, the still I is an upright cylindrical structure consisting of individually steam-jacketed sections which include a large evaporator or flashing chamber 71 at the top, a smaller foam-reducing stripper chamber 72 of about the same length directly below the evaporator, and a series of shorter subjacent stripper chambers 73, 74, 75, 76, 77, 78. Coaxially arranged in the evaporator chamber 71 are a series of conical baffles 79, arranged points-up and having their skirts clear of the chamber wall, and beneath each of them is an inverted frusto-conical baffle 80 having its periphery attached to the chamber wall. The baffles 79 may be supported by an upright axial rod in the chamber 71. In the upper stripper chamber 72 there is a heating coil 81 which may be supplied with high-temperature saturated or superheated steam through a separate connection 82, and exhausted through a connection 83. The stripper chambers 72, 73, 74, 75, 76, 77, 78 are divided from one another by diaphragm plates each perforated with a multitude of small holes 84, and are interconnected by upright stand-tubes 85 mounted in the diaphragms. Each tube 85 extends from a point somewhat above the diaphragm which carries it to a point somewhat below the top of the next lower tube, thus providing for a series of liquid pools or seals in the chambers 73, 74, 75, 76, 77. The lower end of the lowermost tube 85 is bent upward at 86 to provide for a pool in the bottom of the lowermost chamber 78. Besides the oil draw-off 25 and a valved drain pipe 87, a valved steam-supply pipe 88 is connected through the bottom of the chamber 78, for introducing dry or superheated steam of suitably high temperature and pressure, to bubble up through the oil pool in the bottom of this chamber and through the oil in the bottoms of the chambers 77, 76, 75, 74, 73, 72 in succession. The steam pressure in each of the chambers 78, 77, 76, 75, 74, 73, 72 is enough higher than that in the chamber above to maintain the oil pool there, notwithstanding the presence of the fine holes 84 in the separating diaphragms.

Saturated steam of suitable pressure and temperature may be circulated through the jackets of all the sections, being supplied from a common valve-controlled supply pipe 90 through separate valved connections 91, 92, 93, 94, 95, 96, 97, 98 opening into the tops of the jackets, and being exhausted (along with any water of condensation) into a common exhaust-pipe 100, through separate valved connections 101, 102, 103, 104, 105, 106, 107 opening into the jackets near their bottoms. A control valve 108 is shown interposed in the steam supply pipe 90 between the jacket of the evaporator 71 and that of the top stripper section 72. The temperature of the steam used in the jackets will of course depend on the solvent being used, but may be about the same for all the sections.

In extracting soya beans with trichlorethylene, the miscella from the tank G may be pumped through the steam-heated heater or heat-exchange H (Fig. 1) into the top of the evaporating chamber 71 at a pressure of some 15 lbs. above atmospheric, through a small inlet tube 110 (Fig. 12) extending down through the top conical baffle 79 and discharging the liquid at comparatively high velocity. The liquid spreads out in a thin film on the hot baffle surfaces and flows downward in a circuitous course as indicated by the arrows. Under the heat of the baffles and that from the chamber walls, most of the solvent and water in the miscella "flashes" into vapor, and the vapors pass over through the top outlet pipe 26 into the condenser J, Fig. 1. The partially purified oil collecting in the bottom of the chamber 71 runs down through a valved pipe 111 that has a U-bend forming a liquid seal, Fig. 13, into the center of the top stripper chamber 72, where the falling oil is heated by the coil 81, vaporizing some of the solvent and water remaining in it. The partially purified oil passes on down via the pools in the bottoms of the sections 73, 74, 75, 76, 77, and the pipes 85, and the steam from the pipe 88 percolates up through the oil pools, liberating any remaining solvent in the oil. The solvent and water vapors rise through the pipes 85 and pass over through the pipe 27 into the condenser K, Fig. 1.

Figs. 14–24 illustrate an extractor generally similar to the one shown in Figs. 1 and 4–10, so that its corresponding parts and features are marked with the same reference characters, as a means of dispensing with repetitive description, a distinctive letter being added where such distinction seems needful.

As shown in Figs. 14–18, the extraction channel or trough is in effect a cylindrical casing or barrel conformable to the helical feed screw E, although it is constructed as a round-bottomed sheet-metal trough D with a concave top shroud, cover, or "filler" 51 of sheet metal therein, which substantially fills out and completes the circular cross-section, and also coacts with the top of the screw and deflects particles downward into the screw channel. As shown in Figs. 14, 16, 18, the liquid level $l$ is definitely below the top of the screw convolutions 34, just as in Figs. 5–10. By filling up the triangular areas $x, x$ of Fig. 8 and displacing liquid from them, as well as particles in and above these areas, the shroud or filler 51 prevents by-passing of the liquid and counter-feed of particles by such by-passed liquid. The construction of the cylindrical extraction channel as a trough D with a removable filler 51 as described affords easy access to the feed screw E upon occasion—as for the purpose of removing a rag or other obstructive object that might find its way into the apparatus—without necessity for emptying the extractor of liquid and particles.

To further facilitate access to the feed screw E, the filler or shroud 51 is preferably divided transversely into a number of separate sections, including a left-end section 51b and other sections 51c, 51c, 51c, etc., all of which fit between the sides of the trough D with slight clearance, and may rest or float on the screw, see Figs. 14, 15, 18, 19. As best shown in Figs. 14, 15, 19, the sheet metal filler sections 51b, 51c not only have longitudinal bent-up side flanges 52b, 52c (resembling the side flanges 52 of the shroud 51 in Fig. 10), but also have transverse end flanges or walls 113 which are joined (as by welding) to the side flanges at the end corner angles of the filler sections, thus making each filler section an open-top box structure of considerable strength. In addition, the top margins of the side and end flanges 52b, 52c, 113 are themselves bent inward as horizontal flanges 114, still further strengthening the filler sections 51b, 51c. To facilitate removal of the filler or cover sections 51b, 51c, metal strap handles 115 are provided on their longitudinal flanges 114 at suitable points, at least four to a section: i. e., the sections 51c may have these handles 115 at each end, while the section 51b has them at one end and substantially at mid-length. As shown in Figs. 14, 16, 18, the handles 115 are adapted and proportioned to engage against the under sides of the cover plates 55 bolted to the top edge flanges of the trough D, so as to hold the cover or filler sections down in proper position, bearing against the top of the feed screw E or nearly so.

As best shown in Figs. 16 and 19, the filler section 51b near the left-hand end of the trough D embodies certain special features: i. e., its curved shroud portion does not extend clear to its left-hand end wall 113 as in the sections 51c, but is shorter and is bent up on a slope to terminate in a transverse flange 116 in the plane of the longitudinal flanges 114, 114, thus affording an opening in registry with the infeed C for the entrance of the material to be treated, and also providing an inclined surface 54b to depress the particles at the start of their rightwise travel in the feed screw E. As best shown in Fig. 18, the inclined surface 54b includes a triangular central area flanked by two frusto-conical areas 118, 118, whose edges are welded to the side flanges 52b, 52b. The left-hand end wall 113 of the section 51b is shown in Fig. 16 as secured by bolts 119 to a transverse angle bar 120 that is welded to a stout transverse plate 121 spanning the trough D at its top and having its ends welded thereto, thus bracing the trough sides together at this point.

Figs. 20 and 21 illustrate a modified construction that is very suitable for the filler sections 51c, etc. The modification consists in dividing such a section 51c lengthwise on a plane inclined to the vertical, so that the resulting halves can be successively lifted out after removal of the superjacent cover plate(s) 55. This obviates any difficulty that might arise from matter working up between the side flanges 52c and the sides of the trough D, thus "freezing" the filler into the trough D. As here shown, the halves of the split section have sloping abutting longitudinal flanges 123, 123. If desired, the halves of the split section may be fastened together solidly when in place, as by means of screw bolts 125 through their mating flanges 123, 123.

Instead of itself extending out through the trough end at the left, as in Figs. 1, 4, 5, the feed screw shaft 33b may terminate just inside the end wall and be connected by a readily detachable coupling 126 (which may be of a slightly flexible or misalignment-accommodating type) to a short drive shaft 127 extending out through a stuffing box 35b mounted in the trough end wall and journaled in a bearing 35c mounted on a bracket 128 attached to said end wall. The shaft 127 and the feed screw E may be driven through any suitable connection (not shown) to a toothed drive wheel 129 (such as a sprocket or a spur gear) fast on the outboard end of the shaft. The coupling 126, it will be seen, allows the feed screw E to be lifted out and removed from the extractor very easily (after removal of the cover plates 55 and of the filler sections 51b, 51c), without disturbing the stuffing box 35b or the bearing 35c, and even without emptying the extractor trough D of liquid and of particles. As shown in Figs. 14 and 17, the feed screw threads 34b (shown as double at this end of the extractor) have integral overhung end extensions 34c, 34c that extend past the coupling 126 and the inward-projecting end of the stuffing box 35b to the very end of the trough, these extensions 34c, 34c being without any attachment to the shaft 127 at the left of the coupling. When the right-hand end of the feed screw E is lifted above the top of the trough D, Fig. 14, the feed screw can be shifted to the right until the thread extensions 34c, 34c clear the coupling portion on the shaft section 127, and can then be entirely lifted out and removed.

Referring, now, especially to Figs. 15, 16, 17, 22, 23, it will be seen that the left-hand end of the extractor trough D and the mounting of its foraminous resilient strainer screen fabric 40 differ from the structure as shown in Figs. 4 and 5. Below the screw shaft 33b, indeed, the rounded bottom of the trough D is about the same, except for a slight reduction in radius, in correspondence with a reduction in the diameter of the double screw threads 34b, 34b as compared with the single thread 34 throughout the effective length of the extraction channel at and to the right of the infeed C. This reduction in radius of the threads 34b 34b allows the overslung screen 40 to be totally immersed in the liquid at both sides thereof even with the liquid level somewhat below the tops of the full-size screw convolutions 34. Above a level about at the lower side of the screw shaft 33, the trough D has lateral extensions 130, 130 which give its end portion to the left of the infeed C a cruciform outline as looked at in plan, Figs. 15 and 17. The sheet metal screen box 41b that carries the resilient, overslung, foraminous wire mesh screen fabric 40 is also cruciform in plan, with side "arms" 131, 131 in the lateral trough extension 130, 130; and its portions to left and right of said arms 131, 131 extend (with substantial clearance) between the trough sides to left and right of the lateral trough extensions 130, 130, and have vertical guide shoulders, formed by four angles 132 externally welded on, which engage (with slight clearance) between the shoulders at the corners of said lateral trough extensions 130, 130. Thus the screen box 41b is guided and slidable up or down in the cruciform end portion of the trough D, and also has some freedom for shifting transversely. The transverse box "arms" 131, 131 have sheet metal bottom walls 133; but otherwise the box bottom is open to accommodate the upward-curved resilient wire mesh screen fabric 40, whose margins all around are attached to the edges of the bottom opening.

For accurately adjusting and controlling the vertical position of the screen fabric 40 and its box 41b to vary the pressure contact with the thread of the conveyor 34, there are shown four upright supporting rods 134 whose screw threaded upper ends are slotted to take a screw-driver and are in thread engagement with nuts 135 attached to lateral top brackets 136 on the sides of the transverse screen-box "arms" 131, 131, while their unthreaded lower ends are guided in holes in lateral bottom brackets 137 on said box arms. As shown in Fig. 16, the brackets 136, 137 associated with each supporting rod 134 are formed by laterally bent ends of a vertical bar 138 of stout sheet metal, these ends being welded to the corresponding screen box arms 131 substantially at its top and bottom. For accurately adjusting and controlling the transverse position of the screen 40 and its box 41b, there are shown four upright levers 141 fulcrumed about at mid-length on the outer sides of the bars 138 by means of headed pivot pins or bolts 142, and each engaging at its lower end with an outer side or end wall of a lateral trough extension 130, with an adjusting screw 144 threaded through the upper end of each lever 141 and engaging against the outer wall of said trough extension 130. By suitable adjustment of the screw-rods 134 and of the screws 144, the screen 40 can be adjusted as desired both vertically and transversely relative to the double feed screw threads 34b, 34b that wipe along or "across" it as they "progress" lengthwise of the trough D in their rotation, so that these threads shall deflect and flex the screen just as much as desired, and also scrape it with the desired gentleness or severity. The double thread 34b, 34b gives the screen 40 double the amount of wiping that would be produced by a single thread 34 as in Figs. 4 and 5. While the screw shaft 33 and the larger threads 34 serve to feed to the right the material introduced at C, the reduced double threads 34b, 34b serve mainly to wipe and flex the strainer 40. Aside from wiping the strainer, indeed, the second set of threads 34b would be superfluous.

As overflow outlets for discharging liquid and controlling and regulating its level in the extraction trough D relative to the feed screw E, there are shown (Figs. 17, 22, 24) two stand-tubes 22b, 22b each connected through the bottom of a lateral trough extension 130 and extending up through the bottom of a box-arm 131, with fluid-tight freedom of universal relative movement between the latter and the stand-tube. For this purpose, a liquid-tight flexible sleeve 146 is shown as secured fluid-tight at its upper end around each tube 22b and as secured fluid-tight at its lower end around a lip or flange 147 upstanding around an opening in the bottom 133 of the box 41b. Thus the liquid level in the channel D is not altered or affected by adjustment of screen 40 and box 41b. However, the upper sections of the stand-tubes 22b can themselves be adjusted up and down relative to the trough D by screwing them up or down in nipples 148 mounted in the bottoms of its side extensions 130, 130. As best shown in Figs. 14 and 15, there is a transparent window 56 in the cover plate 55 over the screen 40, to allow its condition and action to be easily observed during operation.

Without thereby limiting or defining the invention, it may be of interest to give some principal dimensions suitable for an extractor such as illustrated in Figs. 14–24. For a 12 inch width of trough D and a corresponding diameter of feed screw E, the latter may have a 12 inch pitch for its single thread convolutions 34 and a 10 inch diameter and 6 inch spacing (on centers) for its double-thread convolutions 34b, with an over-all length of about 38½ feet and an axial length of 2 feet for the screen fabric 40, which may be of 40 to 200 mesh. The internal diameter of the solvent inlet pipe 21 may be about 1 inch and that of each overflow outlet pipe or stand-tube 22b may be about ⅞ inch. For operation with soya flakes, the feed screw E may be driven at a speed of about 2 R. P. M., and about 830 lbs. per hour of soya flakes may be introduced at C, with a flow of about 1250 lbs. per hour of trichloroethylene through the trough D.

Having thus described my invention, I claim:

1. In apparatus for counterflow liquid solvent extraction of oleaginous matter from divided material, the combination of a horizontal extraction trough with a transversely rounded bottom, a coacting rotary feed screw with its threads moving in contact with the trough bottom, for advancing the particles to be treated in said trough; an inlet through which solvent is introduced into the trough at the discharge end of the screw; a strainer box mounted in said trough above the screw at its other end, and a finely meshed resilient strainer fabric attached at the bottom of said box and curved over the top of said screw and arranged to be in contact with the screw thread; and an outlet for discharge of miscella from the interior of said strainer box.

2. In apparatus for counterflow liquid solvent extraction of oleaginous matter from divided material, the combination of a closed horizontal extraction trough having a top opening, a transversely rounded bottom and flat sides; a coacting rotary feed screw with a thread moving in contact with the trough bottom, for advancing the particles to be treated in said trough; means for introducing particles to be treated into said trough near one end thereof; lateral enlargements of the trough between its said end and said particle-introducing means; means for supplying solvent into the other end of said trough; a strainer box mounted in said trough above the screw and having side extensions into said lateral trough enlargements, and a finely meshed resilient strainer fabric attached at the bottom of said box and curved over the top of said screw and arranged to be in contact with the screw thread; means constructed and arranged for adjusting said strainer box with said strainer both up and down and transversely relative to said screw to vary the contact pressure of the fabric; and separately adjustable overflow outlet means located in said side enlargements for discharge of liquid from said side extensions of said strainer box and for maintaining a definite liquid level.

3. In apparatus for liquid solvent extraction of matter from divided material, the combination of a horizontal extraction trough having a transversely rounded bottom; a coacting rotary feed screw having a thread moving in contact with the trough bottom throughout its length from a point where particles are received into one end of the trough to a point where they are discharged; means for supplying liquid solvent to the trough; an overflow outlet remote from said receiving point located and arranged to maintain a liquid level below the top of the screw; a finely meshed resilient strainer fabric for said outlet arranged to be in contact with the thread of the screw; means forming a wall across the upper part of the trough at the discharge end of the screw, said wall extending from the top of the screw down below the level of said liquid outlet and having an opening thereunder for the discharge of treated particles from the screw; top guide means in the trough for controlling treated particles as they are advanced toward the wall by said screw, said guide means extending forward from said wall over and around the top of the screw.

4. In apparatus for counterflow liquid solvent extraction of matter from divided material, the combination of a closed horizontal extraction trough having a transversely rounded bottom and an opening in its top; a coacting rotary feed screw having a thread moving in contact with the trough bottom, for advancing the particles to be treated in said trough; an inlet through which solvent is introduced into the trough at the discharge end of the screw; a strainer box removably mounted in said trough over and around the top of the screw at its other end and withdrawable from the trough through its top opening aforesaid, with a finely meshed resilient strainer fabric attached to the bottom of said box curved over the top of said screw and arranged to be in contact with the screw thread; and an overflow outlet located and arranged for the discharge of miscella from the interior of said strainer box and for maintaining a liquid level below the top of the screw.

5. In apparatus of the character described, the combination of a horizontal extraction trough with a transversely rounded bottom; means for continually introducing liquid solvent into one end of the trough; an overflow outlet for discharging liquid from the other end of the trough arranged to maintain a liquid level below the top of the trough; a supply chute with control means at said other end of the trough for continually introducing divided material to be extractively treated into the liquid; a rotary feed screw in said trough having a thread moving in contact with the trough bottom from said material introducing means to the liquid receiving end of the trough, for feeding the material along in the liquid from the former to the latter, the tops of the threads extending above the effective level of said liquid outlet; a finely meshed resilient strainer fabric for said outlet arranged to be in contact with the thread of the screw; a closed tubular lift conduit connected laterally to the liquid receiving end of said trough and sloping upward at an acute angle to the horizontal; a screw conveyor in said lift conduit for elevating the material as the same is delivered thereto by said feed screw; a closed tubular drier connected to the upper end of said lift conduit; rotary conveyor screw means for advancing the material from said lift conveyor through said drier; and means constructed and arranged to drive the rotary conveyor screws in said trough, lift conduit and drier, the lift and drier screws at faster rates of feed capactly than the feed of the material by the screw in the trough.

6. The combination with a treating vessel for treating divided material with flowing liquid extractant, and an outlet for discharge of the liquid from said vessel; of a finely meshed curved resilient strainer screen fabric for said outlet, and a revolving wiper for wiping against the concave side of said strainer fabric and thereby flexing the fabric.

7. The combination with a round bottomed trough for the flow of liquid extractant, a rotary feed screw in said trough and moving with its thread in contact with the trough bottom for advancing divided material in said trough in contact with the liquid therein, and an outlet for discharge of the liquid from said trough; of a finely meshed strainer fabric for said outlet curved around the screw and arranged to be in contact with the thread of the rotating screw.

8. In apparatus for counterflow liquid solvent extraction of matter from divided material, the combination of a horizontal extraction trough with a transversely rounded bottom, a coacting rotary feed screw having an impervious thread moving in contact with the trough walls from a point where the particles are received into one end of the trough to a point where they are removed therefrom; means for continually driving said screw at a definite but variable rate of feed; an inlet for continually supplying liquid solvent into the channel, and an adjustable liquid discharge outlet remote from the inlet located at a level below the top of the screw; a finely meshed resilient strainer fabric for said outlet curved around the screw and arranged to be in contact with the thread of the screw; a chute with a metering element for introducing the particles into the screw at the aforementioned point of reception; and a conveyor for continually removing treated particles from the discharge end of the screw.

9. In an apparatus for liquid solvent extraction of matter from divided material, the combination of a horizontal extraction trough with straight sides and a transversely rounded bottom; a coacting rotary feed screw with a thread moving in contact with the trough bottom, for advancing the particles of the material to be treated in said trough; an inlet for supplying liquid solvent into the particle discharge end of the trough; an overflow discharge outlet located and arranged at the other end of the trough at a level below the top of the screw; and removable filler means in said trough contacting the top of said screw throughout the major portion of its length, and forming with the trough a substantially cylindrical passage through which the material is advanced by the screw.

10. In apparatus for counterflow liquid solvent extraction of matter from divided material, the combination of a horizontal extraction trough with a transversely rounded bottom; a coacting rotary feed screw having a thread moving in contact with the trough bottom from a point where the particles of the material are received into one end of the trough to a point where they are discharged at its other end; means for driving said screw; means for supplying liquid solvent into said particle discharge end of the trough; an overflow outlet at a level below the top of the screw for discharging miscella located and arranged between the other end of the trough and the point where particles are received as aforesaid; a finely meshed resilient strainer fabric screen for said outlet curved around the screw and arranged to be in contact with the screw thread; a chute with a metering element for introducing the particles into the conveyor screw at the aforementioned point of reception; a conveyor structure for removing treated particles from the discharge end of the screw, including a casing connected to the corresponding trough end with a wall across the upper part of the trough extending down below the level of the aforesaid liquid outlet and having an opening thereunder for passage of liquid, as well as of particles; and top guide means for the approaching particles extending forward in the trough from said wall over and around the top of said screw and having its front end flared upward.

11. In apparatus for counterflow liquid solvent extraction of matter from divided material, the combination of a horizontal extraction trough with a transversely rounded bottom; a coacting rotary feed screw having a thread moving in contact with the trough bottom for advancing the particles to be treated in said trough; a drive shaft for said screw detachably coupled thereto and extending out through a stuffing box at one trough end; an inlet for solvent at the other trough end; a strainer box removably mounted in said trough over and around the top of the screw at that end which is coupled to said drive shaft, with a finely meshed resilient strainer fabric attached to the bottom of said box curved over the top of said screw and arranged to be in contact with the thread of said screw; and an adjustable overflow outlet means located at a level below the top of said screw and arranged for discharge of miscella from the interior of said strainer box; a wall across the upper part of the trough at the discharge end of the screw, extending from the top of the screw down below the level of the aforesaid liquid outlet and having an opening thereunder for the discharge of treated particles from the screw; and removable filler means extending forward in the trough from said wall over and around the top of the screw and having its front end flared upward.

12. In apparatus for counterflow liquid solvent extraction of matter from divided material, the combination of a closed horizontal extraction trough having a top, a transversely rounded bottom and an opening in its top; a coacting rotary feed screw having its thread moving in contact with the trough bottom, for advancing the particles to be treated in said trough; an inlet through which solvent is introduced into the trough at the discharge end of the screw; a strainer box mounted in said trough above the screw at the other end of the latter, with a finely meshed resilient strainer fabric attached to the bottom of said box curved over the top of said screw and arranged to be in contact with the screw thread; means for adjusting said strainer box up and down relative to said screw to vary the contact pressure of the fabric upon the thread of said screw; and a separately adjustable overflow outlet for discharging liquid from the interior of said strainer box, supported independently of the latter.

CLARENCE F. DINLEY.

REFERENCES CITED

The following references are of record in the file of this patent:

UNITED STATES PATENTS

| Number | Name | Date |
|---|---|---|
| 126,300 | Hutchinson | Apr. 30, 1872 |
| 550,035 | Wheeler | Nov. 19, 1895 |
| 930,909 | Wiegand | Aug. 10, 1909 |
| 1,081,949 | DuPont | Dec. 23, 1913 |
| 1,235,672 | Fitch | Aug. 7, 1917 |
| 1,762,593 | Schwarz | June 10, 1930 |
| 1,812,107 | McCullough | June 30, 1931 |
| 2,107,537 | Jones | Feb. 8, 1938 |
| 2,183,837 | Hamilton | Dec. 19, 1939 |
| 2,187,208 | McDonald | Jan. 16, 1940 |
| 2,264,390 | Levine | Dec. 2, 1941 |
| 2,377,135 | Dinley | May 29, 1945 |
| 2,377,136 | Dinley | May 29, 1945 |

FOREIGN PATENTS

| Number | Country | Date |
|---|---|---|
| 4,005 | Great Britain | 1890 |
| 3,804 | Great Britain | 1887 |
| 7,757 | Switzerland | Nov. 10, 1893 |

OTHER REFERENCES

Elements of Chem. Eng., 2d ed. 1936, Badger and McCabe, page 421.